April 12, 1932.　　　L. R. MOSS ET AL　　　1,853,987
AUTOMOBILE RADIATOR CAP ORNAMENT
Filed Dec. 1, 1931
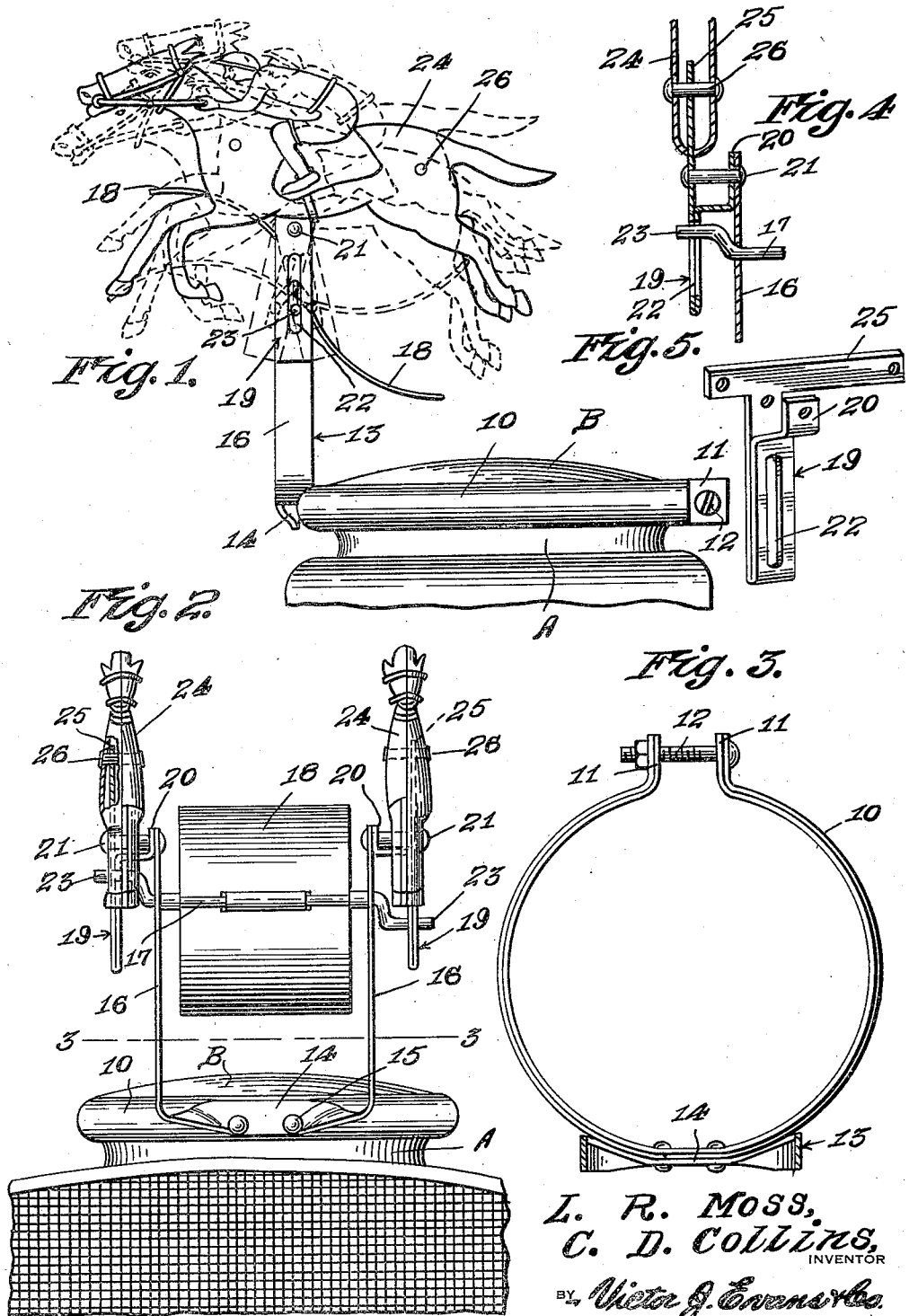
L. R. MOSS,
C. D. COLLINS,
INVENTOR Patented Apr. 12, 1932

1,853,987

UNITED STATES PATENT OFFICE

LEE R. MOSS AND CHARLES D. COLLINS, OF SAN DIEGO, CALIFORNIA

AUTOMOBILE RADIATOR CAP ORNAMENT

Application filed December 1, 1931. Serial No. 578,348.

The invention relates to an automobile radiator cap ornament and more especially to a motion ornament for mounting upon the radiator caps of automobiles or other motor driven vehicles.

The primary object of the invention is the provision of an ornament of this character, wherein movable objects, such for example as those imitative of racing horses, dogs or the like, will be set in motion under wind pressure so as to be attractive and ornamentally effective, the mounting of the ornament being novel in form and likewise the working thereof for imparting motion thereto.

Another object of the invention is the provision of an ornament of this character which is extremely simple in construction, readily and easily mounted upon and demounted from the cap of an automobile radiator and in position thereon will automatically operate, being possessed of few parts yet the same is strong, durable, and inexpensive to manufacture.

With these and other objects in view, the invention consists in the features of construction, combination and arrangement of parts as will be hereinafter more fully described in detail, illustrated in the accompanying drawings, which discloses the preferred embodiment of the invention, and pointed out in the claim hereunto appended.

In the accompanying drawings:—

Figure 1 is a side elevation of the ornament constructed in accordance with the invention mounted upon an automobile radiator cap showing by full lines one position of the objects and by dotted lines other positions thereof during the working of the same.

Figure 2 is a front elevation.

Figure 3 is a sectional view on the line 3—3 of Figure 2.

Figure 4 is a fragmentary vertical detail sectional view.

Figure 5 is a perspective view of one of the rocker members of the ornament.

Similar reference characters indicate corresponding parts throughout the several views in the drawings.

Referring to the drawings in detail, A designates generally the filling spout of an automobile radiator and B the closure cap for said spout which cap is demountable from the spout and is of a standard type.

Engageable peripherally with the cap B is a clamping ring 10 which is in the form of a split internally channeled band having outturned terminal ears 11, the channel of the band being adapted to accommodate the periphery of said cap B while engaged through the ears 11 is a nut carrying bolt 13 so that the said band can be made fast about the cap to embrace the same.

Carried at the forward portion of the ring 10 is a U-shaped frame 13 the flattened intermediate portion 14 of which is riveted as at 15 or otherwise secured to the ring 10 with the arms or uprights 16 vertically disposed in spaced parallel relation to each other. Journaled transversely in the arms or uprights 16 is a shaft 17 which carries a wind blade 18, the same being fixed to the shaft between the arms or uprights 16 of the frame 13 and is operated by wind impact for the rotation of the shaft 17.

Arranged upon the frame 13 outside of the same are rockers 19, these through the medium of offset extensions 20 are supported upon pivots 21 while the slotted levers 22 of said rockers have engaged therein terminal cranks 23, these being reversely set for reverse operation of said rockers 19 on the rotation of the blade 18 under wind impact.

The rockers support objects 24, in this instance being imitative of racing horses although they may be imitative of other animals such as dogs or the like and each rocker 19 has a cross bar 25 which is disposed internally of the object 24 and is coupled thereto through the medium of rivets 26 which are passed transversely through the body of said object 24 and also through the cross bar 25 of the rocker 19 so that the object 24 will be made fast and carried directly by the rocker.

The cross bars 25 on the rockers 19 are disposed parallel with each other and longitudinally directed with respect to the longitudinal extent of an automobile so that the heads of the objects 24 on the rockers will be free. By the reverse disposition of the cranks 23 it will be apparent that the objects will have a reverse disposition and this will cause the motion thereof when operated on rotation of the wind blade 18, the latter being driven by wind pressure, the blade being reversely curved for the driving of the objects in one direction.

It is of course to be understood that while the objects 24 are shown of a certain imitative character these may be varied for imitation of other objects of animate kind.

What is claimed is:—

An ornament of the character described comprising a pair of hollow bodies indicative of running images, substantially T-shaped members each presenting a cross bar fastened interiorly of each body and having a slotted stem projected exteriorly of and beneath said body, an ear extended laterally from the stem above the slots therein, an automobile radiator cap engaging bracket and constituting spaced bearings, pivots projected from the bearings and swingingly supporting said ears of the stem, a double crank shaft journaled in said bearings and engaging the slots in the stems, and a wind operated blade fixed to the shaft between the bearings for rotating said shaft.

In testimony whereof we affix our signatures.

LEE R. MOSS.
CHARLES D. COLLINS.